Jan. 22, 1963 J. AURICOSTE 3,075,182

MAGNETIC CORE SYSTEM SUPPLIES

Filed April 30, 1958

Inventor
Jean Auricoste
By Ralph B. Stewart
attorney

United States Patent Office 3,075,182

Patented Jan. 22, 1963

3,075,182

MAGNETIC CORE SYSTEM SUPPLIES

Jean Auricoste, Paris, France, assignor to Societe d'Electronique et d'Automatisme, Courbevoie, Seine, France Filed Apr. 30, 1958, Ser. No. 731,942
Claims priority, application France May 2, 1957
3 Claims. (Cl. 340—174)

The present invention relates to binary data handling and processing systems wherein the binary bits or digits of information are represented as magnetic conditions of saturable magnetic cores having a substantially rectangular hysteresis loop. It is known that a magnetic core of such character presents two stable magnetic conditions, a positive or P condition and a negative or N condition. In binary information handling systems using such cores, a numerical significance may be attached to each one of the said magnetic conditions so that the P condition represents the digital value 1 and the N condition the digital value 0, or vice-versa, according to the location of the magnetic core in such a system.

The stored magnetic conditions of the various cores are stepped or shifted from one stage to the next stage by shift or stepping pulses which are supplied to the stage linking circuits at regular time intervals.

It is the purpose of the present invention to provide an improved stepping pulse supply arrangement for such systems as herein above defined with respect to one illustrative embodiment thereof, whereby optimum conditions of safety and continuity of operation are met without any recourse to highly stabilized primary voltage supply sources, such a stabilization being otherwise needed with respect to both the voltage and frequency of such primary sources of alternating voltage.

A further object of the invention is to provide an improved stepping pulse supply arrangement that avoids any undue loading of the diodes in the interconnection networks of such systems and also enables a better dimensioning of the series damping resistances in these networks by avoiding unnecessary consumption of electrical energy thereby, which occurs when during a transmission period from one core to the next one, the concerned core has reached its final stable magnetic condition.

A typical though simple magnetic core arrangement in this respect is shown in the upper part of the attached FIG. 1. This arrangement is a part of a dynamic register which comprises as shown five "stages," each of which includes a magnetic core of a material having a substantially rectangular hysteresis loop of the kind shown in FIG. 3 for instance, but much narrower with respect to the axis of the abscissae H. The five cores are designated M1 to M5, respectively. Each core is provided with an input winding of a uniform number of turns throughout the stages, and an output winding also of a uniform number of turns throughout the register, but the output windings have a greater number of turns than the input windings, as it will be explained later. The magnetic stages are shown as interconnected in a cascade arrangement, the output winding of one core being serially connected to the input winding of the next following core through a unidirectionally conducting element, such as a diode D, and through an oscillation damping resistance R, and such interconnection network being fed with stepping pulses derived from an alternating voltage $V_s$ taken from between the mid-point and one end of the secondary winding of a supply transformer T which is energized by an alternating voltage $V_e$ applied across the primary winding thereof. Of course, the waveform of this alternating supply voltage may not be a pure sine wave, since similar operative result may be obtained with other forms of alternating voltages, such as square or saw-toothed forms for instance.

The interconnection networks are alternately connected across the one and the other halves of the secondary winding of the transformer T, so that the odd numbered networks (I), (III), etc. are fed in phase opposition with respect to the even numbered networks (II), (IV), etc.

This system is a two-core per bit (or digit) system, which means that two successive digits of any information stored therein are always spaced apart by one temporarily unused magnetic core. When for instance the magnetic conditions of the first, third and fifth cores (the odd numbered cores) represent digital values of an information code, the second and fourth cores (the even numbered cores) do not represent any digital values. At the next step of operation, the digital values of the odd numbered cores will be transmitted to the even numbered cores, respectively, the value on the fifth core being transmitted to a sixth one, not shown, and so forth. Actually, however, the representation of a digital value will be reversed from core to core in the following manner:

It is assumed that the first magnetic core M1 on the left-hand of the drawing is the input core of the register, and it is also assumed that the part of the register shown in the drawing has been cleared, all stages thereof representing the digital value 0. It is further assumed that this digital value 0 is represented by the N condition on cores of the odd numbered stages, and that any diode D is so connected that it admits passage of current therethrough, when an alternation of the A.C. voltage across the terminals of the inter-connection network is such as to act through the output winding included in the network for driving the magnetic condition of this core from the P to the N condition. Such an alternation will be said to be a "positive" one, according to the left-hand part (1) of the graph of FIG. 2. This graph is plotted with $V_s$ as ordinates with respect to the time as abscissae.

In the above-defined "cleared" condition of the register, a "positive" alternation applied to the networks (I) and (III) will find both cores M1 and M3 in the N magnetic condition. These cores will be driven in the direction of a greater saturated N condition so that no limitation of the current value in the networks (I) and (III) will be encountered. Thus, high-value currents will pass through the input windings of magnetic cores M2 and M4 and these cores will be driven from the N to the P condition. Consequently, at the end of any alternation which is a "positive" one for the odd numbered networks (I), (III), . . . the second, fourth, . . . cores (even numbered cores) will represent this zero digital value by their P magnetic condition whereas the first, third, . . . cores will represent this zero value by their N magnetic condition. During the reception of a "positive" alternation by the networks (I), (III), . . . a "negative" alternation is applied to the networks (II), (IV), . . . as their voltage supply is in phase opposition with respect to the supply of the first-mentioned networks.

The next following alternation of the supply voltage $V_e$ will appear as a "positive" alternation for the networks (II), (IV), . . . and as a "negative" alternation for the networks (I), (III), . . . of the register. This "positive" alternation will find the second, fourth, . . . cores in their P magnetic condition and will consequently bring them back to their N magnetic condition. In so doing, the current value flowing in these networks (II), (IV), . . . will be restricted to the value of the coercitive current of the cores and consequently the cores (III), (V), . . . will be left in their N condition. A certain amount of back current tends to be induced in the interconnection network preceding any core which is driven from P to N but a sufficient limitation of this back-acting current is obtained by the provision of a suitably high ratio of output to input turns on each core.

Assuming now that the first core M1 had a digital value 1 recorded thereon and consequently is in the P condition when the "positive" alternation is applied to the network (I), this alternation will reset it back to the N condition so that the second core will not be brought to the P condition thereof but will remain at the N magnetic state. Thus, at the next alternation of the supply voltage, acting as a "positive" one on the network (II), the second magnetic core M2 will be driven to greater saturation in the N direction, so that the third core M3 will be brought from N to P, thus representing the digital value 1; and so forth.

In accomplishing the objects of the invention in a system as described, the important factor in a transfer of an information bit from one stage to a next following one in the cascade lies in the area covered by a stepping voltage pulsation during its change of amplitude with time. This factor is more important in cases where one or more stages comprise a plurality of magnetic cores and windings therefor which are used for performing, for instance, elementary logical operations between (or with) several bits of information. If this time-voltage area of the stepping pulse is maintained of constant value regardless of the changes of amplitude and frequency of the supply voltage, the herein above-mentioned optimum conditions of operation of the system will be reached.

The objects and advantages of my invention will be apparent from the following detailed description taken in conjunction with the accompanying drawing in which.

Figure 1:
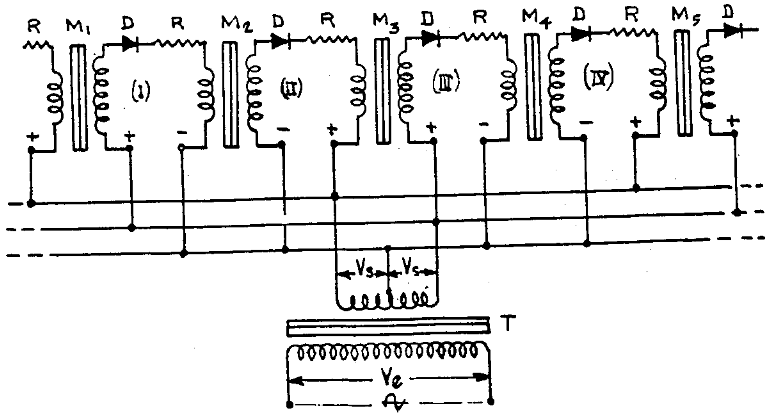
FIG. 1 is a schematic circuit diagram of a 5-stage magnetic core arrangement embodying the invention.
Figure 2:
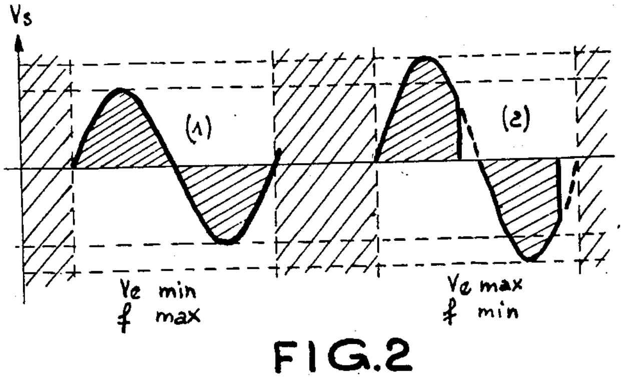
FIG. 2 illustrates wave forms on the secondary transformer winding before saturation (1) and after saturation (2)
Figure 3:
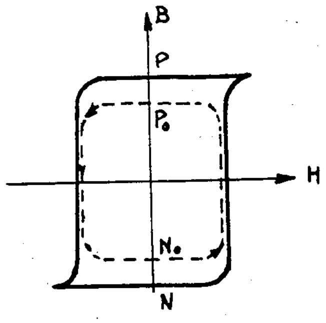
FIG. 3 is an idealized hysteresis loop of a magnetic material which can preferably be utilized in the core of the stepping pulse supply transformer T.

According to the invention, the desired form of a stepping pulse is obtained by providing the transformer T with a core of magnetic material having a substantially rectangular hysteresis loop, such as the one shown in the graph of FIG. 3, which is much wider than the loop of the cores M1 to M5. With such a supply arrangement, and with a suitable dimensioning of the said core, as hereinbelow explained in relation to the graphs of FIG. 2, optimum conditions of operation may be ensured within predetermined limits of variation of the amplitude and frequency of the voltage applied to the primary of this transformer T.

The magnetic core of T is made such that for a minimum value $V_{e\ min}$ of the input supply voltage $V_e$, and at the maximum frequency thereof, within predetermined limits of changes or fluctuations of amplitude and frequency of the A.C. source (for instance the electrical mains or a converter supplied therefrom) the secondary voltage $V_s$ has the proper value for the safe execution of the transfer from stage to stage in the magnetic core circuit supplied from the secondary of the said transformer. In such a case, left-hand graph (1) of FIG. 2, the transformer T reproduces at the outputs thereof the sine waveform of its input. In each alternation or half-period of the sine wave, the hysteresis cycle of the transformer core will be traversed from $N_o$ to $P_o$, and from $P_o$ to $N_o$ during the next following and oppositely directed alternation of the supply. The magnetic saturation points P and N in the core of transformer T will not be reached in such a condition. Actually, the transformer will normally act as a conventional transformer which does not distort the waveform of the amplified voltage applied to the primary winding thereof.

The variation of magnetic flux within a core is, as is well known, the integral with respect to the time of the ratio (primary voltage/supply frequency) multiplied by a constant coefficient 1/A, with A related to the number of turns of the primary winding of the core.

Where the voltage and frequency are of proper values, each area of each alternation of the voltage $V_s$ will be totally used for the control of the information handling system. This is shown in the said graph (1) of FIG. 2 by the shading cross lines over the said areas.

When the input supply voltage for transformer T increases beyond normal operating value (and/or the frequency thereof decreases), the core of the transformer T will will reach a saturated condition at each alternation of the input voltage, the magnetic material of this core will pass from N to P and back, according to the directions of the said alternations.

In such a case the waveform will be distorted from the primary to the secondary winding and the appearance thereof at the said secondary winding will be such as shown in FIG. 2, right-hand graph (2), which represents the definite case of a maximum amplitude of $V_e$ at a minimum frequency thereof permitted for the operation of the system. This distortion is inherently such, for a rectangular hysteretic loop material constituting the core of the transformer T, that the area of each transmitted alternation $V_s$ remains constant despite the changes of amplitude and/or frequency of $V_e$. More definitely, the transmission suddenly ceases before the actual end of the primary alternation, as shown, once the useful value of the area is reached, corresponding to the saturation of the transformer core during this alternation. As stated, this will remain true even if the input voltage $V_e$ is not truly a sine waveform but is either a trapezoidal, a rectangular or a symmetrical saw-toothed waveform.

Of course, for a complete system, a plurality of such saturable core supply transformers will be provided for parts of this system distinct from each other and according to the design of these parts mainly with respect to the number of magnetic core stages thereof and with respect to the power of transmission of the designed transformers.

What is claimed is:

1. In combination, a transformer having a primary winding, a mid-tapped secondary winding and a core of a magnetic material of substantially rectangular hysteresis loop for input voltages above a certain value, a source of unstablized input voltage of alternating character applied to the said primary winding and being subject to increase in value above said certain value, a plurality of saturable magnetic cores arranged in a cascade, at least one input winding and one output winding on each of said cores of the said plurality, a plurality of interconnecting networks between the said cores of the said plurality, each network comprising a single-loop circuit connected across one half-portion of said secondary winding and including, in series circuit relation, at least one output winding of one of the said cores and at least one input winding of the next adjacent core, and a unidirectionally conducting element, odd and even numbered networks being connected across different half-portions of said secondary winding, said transformer operating below saturation to produce a stepping pulse on each alternation of said input voltage of normal operating value below said certain value, and said transformer core being saturable by said input voltage upon increase in value above said certain value to produce stepping pulses of substantially the same time-voltage value as the stepping pulse produced by input voltages below said certain value.

2. A combination according to claim 1, wherein each interconnecting network includes a series resistance.

3. In combination a plurality of saturable magnetic cores having a rectangular hysteresis loop and arranged in a cascade, an input winding and an output winding on each of the said cores, an interconnecting control network between each pair of adjacent cores, each of the said networks comprising a single-loop circuit connecting in series circuit relation an output winding of one core, an input winding of the next adjacent core, a unidirectionally conducting member, and a pair of voltage supply terminals, a transformer having primary and secondary windings coupled through a magnetic core having a rectangular hysteresis loop of a broader base than the hysteresis loops of said saturable magnetic cores, and being saturable at a certain input voltage value, a source of alternating current for energizing said primary winding and being subject to voltage fluctuations above and below said certain value, connections from said secondary winding for energizing the odd numbered control networks in the same phase relation, connections from said secondary winding for energizing the even numbered control networks in an opposite phase relation, said transformer operating below saturation to produce a stepping pulse on each alternation of said input voltage of normal operating value below said certain value, and said transformer core being saturable by said input voltage upon increase in value above said certain value to produce stepping pulses in said control networks of a substantially constant value of the integral of voltage with respect to time.

References Cited in the file of this patent

UNITED STATES PATENTS

| | | |
|---|---|---|
| 2,704,842 | Goodell et al. | Mar. 22, 1955 |
| 2,708,722 | An Wang | May 17, 1955 |
| 2,792,564 | Ramey et al. | May 14, 1957 |
| 2,816,278 | Whitely | Dec. 10, 1957 |
| 2,832,951 | Browne | Apr. 29, 1958 |
| 2,849,625 | Germain | Aug. 26, 1958 |
| 2,873,438 | Bieganski et al. | Feb. 10, 1959 |

FOREIGN PATENTS

| | | |
|---|---|---|
| 1,042,649 | Germany | Nov. 6, 1958 |

OTHER REFERENCES

IBM Technical Disclosure Bulletin, page 36, vol. 1, No. 4, December 1958, "Minority Carrier Storage Core Transfer," H. Flaisher.